(12) United States Patent
Ghosh et al.

(10) Patent No.: US 7,672,549 B2
(45) Date of Patent: Mar. 2, 2010

(54) SOLAR ENERGY CONCENTRATOR

(75) Inventors: Shondip Ghosh, Berkeley, CA (US); David Sheldon Schultz, San Francisco, CA (US)

(73) Assignee: Banyan Energy, Inc., Kensington, CA (US)

( * ) Notice: Subject to any disclaimer, the term of this patent is extended or adjusted under 35 U.S.C. 154(b) by 271 days.

(21) Appl. No.: 11/852,854

(22) Filed: Sep. 10, 2007

(65) Prior Publication Data

US 2009/0064993 A1    Mar. 12, 2009

(51) Int. Cl.
G02B 6/26 (2006.01)
H01L 31/00 (2006.01)
F24J 2/10 (2006.01)

(52) U.S. Cl. .................. 385/31; 385/33; 385/146; 385/900; 136/259; 126/684; 126/685

(58) Field of Classification Search ............. 385/900, 385/901, 146, 134, 100, 36, 31, 33; 126/634, 126/684, 685; 136/259
See application file for complete search history.

(56) References Cited

U.S. PATENT DOCUMENTS

| | | |
|---|---|---|
| 705,778 A | 7/1902 | McCabe |
| 3,780,722 A | 12/1973 | Swet |
| 4,029,519 A | 6/1977 | Schertz et al. |
| 4,357,486 A | 11/1982 | Blieden et al. |
| 4,379,944 A | 4/1983 | Borden et al. |
| 4,411,490 A | 10/1983 | Daniel |
| 4,505,264 A | 3/1985 | Tremblay |
| 4,863,224 A | 9/1989 | Afian et al. |
| 5,050,946 A | 9/1991 | Hathaway et al. |
| 5,146,354 A | 9/1992 | Plesinger |
| 5,150,960 A | 9/1992 | Redick |
| 5,237,641 A | 8/1993 | Jacobson et al. |
| 5,253,089 A | 10/1993 | Imai |
| 5,303,322 A | 4/1994 | Winston et al. |
| 5,323,477 A | 6/1994 | Lebby et al. |
| 5,339,179 A | 8/1994 | Rudisill et al. |
| 5,341,231 A | 8/1994 | Yamamoto et al. |
| 5,353,075 A | 10/1994 | Conner et al. |
| 5,359,691 A | 10/1994 | Tai et al. |
| 5,386,090 A | 1/1995 | Hofmann |
| 5,390,085 A | 2/1995 | Mari-Roca et al. |
| 5,390,276 A | 2/1995 | Tai et al. |
| 5,392,199 A | 2/1995 | Kashima et al. |

(Continued)

FOREIGN PATENT DOCUMENTS

JP    2001-127331 A    5/2001

(Continued)

OTHER PUBLICATIONS

Ghosh, Shondip and David Schultz, "A New Approach to Concentrating and Aggregating Light Energy," Jun. 2007.

(Continued)

*Primary Examiner*—Brain M Healy
(74) *Attorney, Agent, or Firm*—Foley & Lardner LLP

(57) ABSTRACT

A solar concentrator having a concentrator element for collecting input light, a reflective component with a plurality of incremental steps for receiving the light and also for redirecting the light, and a waveguide including a plurality of incremental portions enabling collection and concentration of the light.

32 Claims, 9 Drawing Sheets

U.S. PATENT DOCUMENTS

| | | |
|---|---|---|
| 5,396,350 A | 3/1995 | Beeson et al. |
| 5,400,224 A | 3/1995 | DuNah et al. |
| 5,408,388 A | 4/1995 | Kobayashi et al. |
| 5,410,454 A | 4/1995 | Murase et al. |
| 5,418,384 A | 5/1995 | Yamana et al. |
| 5,420,761 A | 5/1995 | DuNah et al. |
| 5,428,468 A | 6/1995 | Zimmerman et al. |
| 5,432,876 A | 7/1995 | Appeldorn et al. |
| 5,438,484 A | 8/1995 | Kanda et al. |
| 5,440,197 A | 8/1995 | Gleckman |
| 5,455,882 A | 10/1995 | Veligdan |
| 5,467,417 A | 11/1995 | Nakamura et al. |
| 5,477,239 A | 12/1995 | Busch et al. |
| 5,479,275 A | 12/1995 | Abileah |
| 5,485,291 A | 1/1996 | Qiao et al. |
| 5,485,354 A | 1/1996 | Ciupke et al. |
| 5,499,165 A | 3/1996 | Holmes, Jr. |
| 5,506,929 A | 4/1996 | Tai et al. |
| 5,521,725 A | 5/1996 | Beeson et al. |
| 5,528,709 A | 6/1996 | Koike et al. |
| 5,528,720 A | 6/1996 | Winston et al. |
| 5,542,017 A | 7/1996 | Koike |
| 5,555,329 A | 9/1996 | Kuper et al. |
| 5,579,134 A | 11/1996 | Lengyel |
| 5,580,932 A | 12/1996 | Koike |
| 5,581,683 A | 12/1996 | Bertignoll et al. |
| 5,594,830 A | 1/1997 | Winston et al. |
| 5,598,281 A | 1/1997 | Zimmerman et al. |
| 5,608,837 A | 3/1997 | Tai et al. |
| 5,621,833 A | 4/1997 | Lau et al. |
| 5,627,926 A | 5/1997 | Nakamura et al. |
| 5,631,994 A | 5/1997 | Appeldorn et al. |
| 5,640,483 A | 6/1997 | Lin |
| 5,647,655 A | 7/1997 | Kashima et al. |
| 5,648,858 A | 7/1997 | Shibata et al. |
| 5,659,643 A | 8/1997 | Appeldorn et al. |
| 5,664,862 A | 9/1997 | Redmond et al. |
| 5,664,873 A | 9/1997 | Kanda et al. |
| 5,667,762 A | 9/1997 | Fukushima et al. |
| 5,668,913 A | 9/1997 | Tai et al. |
| 5,671,994 A | 9/1997 | Tai et al. |
| 5,673,128 A | 9/1997 | Ohta et al. |
| 5,684,354 A | 11/1997 | Gleckman |
| 5,692,066 A | 11/1997 | Lee et al. |
| 5,704,703 A | 1/1998 | Yamada et al. |
| 5,710,793 A | 1/1998 | Greenberg |
| 5,806,955 A * | 9/1998 | Parkyn et al. ............... 362/612 |
| 5,828,427 A | 10/1998 | Faris |
| 5,835,661 A | 11/1998 | Tai et al. |
| 5,838,403 A | 11/1998 | Jannson et al. |
| 5,854,872 A | 12/1998 | Tai |
| 5,870,156 A | 2/1999 | Heembrock |
| 5,877,874 A | 3/1999 | Rosenberg |
| 5,892,325 A | 4/1999 | Gleckman |
| 5,905,583 A | 5/1999 | Kawai et al. |
| 5,905,826 A | 5/1999 | Benson, Jr. et al. |
| 5,914,760 A | 6/1999 | Daiku |
| 5,926,601 A | 7/1999 | Tai et al. |
| 5,977,478 A | 11/1999 | Hibino et al. |
| 5,982,540 A | 11/1999 | Koike et al. |
| 5,993,020 A | 11/1999 | Koike |
| 6,002,829 A | 12/1999 | Winston et al. |
| 6,005,343 A | 12/1999 | Rakhimov et al. |
| 6,007,209 A | 12/1999 | Pelka |
| 6,021,007 A | 2/2000 | Murtha |
| 6,043,591 A | 3/2000 | Gleckman |
| 6,072,551 A | 6/2000 | Jannson et al. |
| 6,104,447 A | 8/2000 | Faris |
| 6,108,059 A | 8/2000 | Yang |
| 6,111,622 A | 8/2000 | Abileah |
| 6,123,431 A | 9/2000 | Teragaki et al. |
| 6,129,439 A | 10/2000 | Hou et al. |
| 6,134,092 A | 10/2000 | Pelka et al. |
| 6,151,089 A | 11/2000 | Yang et al. |
| 6,164,799 A | 12/2000 | Hirmer et al. |
| 6,172,809 B1 | 1/2001 | Koike et al. |
| 6,222,598 B1 | 4/2001 | Hiyama et al. |
| 6,234,656 B1 | 5/2001 | Hosseini et al. |
| 6,252,155 B1 | 6/2001 | Ortabasi |
| 6,266,108 B1 | 7/2001 | Bao et al. |
| 6,313,892 B2 | 11/2001 | Gleckman |
| 6,335,999 B1 | 1/2002 | Winston et al. |
| 6,347,874 B1 | 2/2002 | Boyd et al. |
| 6,351,594 B1 | 2/2002 | Nakamura et al. |
| 6,379,016 B1 | 4/2002 | Boyd et al. |
| 6,409,356 B1 | 6/2002 | Nishimura |
| 6,428,198 B1 | 8/2002 | Saccomanno et al. |
| 6,440,769 B2 | 8/2002 | Peumans et al. |
| 6,473,554 B1 | 10/2002 | Pelka et al. |
| 6,476,312 B1 | 11/2002 | Barnham |
| 6,496,237 B1 | 12/2002 | Gleckman |
| 6,497,939 B1 | 12/2002 | Obuchi et al. |
| 6,512,600 B1 | 1/2003 | Kawai et al. |
| 6,576,887 B2 | 6/2003 | Whitney et al. |
| 6,592,234 B2 | 7/2003 | Epstein et al. |
| 6,612,709 B2 | 9/2003 | Yamada et al. |
| 6,623,132 B2 | 9/2003 | Lekson et al. |
| 6,639,349 B1 | 10/2003 | Bahadur |
| 6,644,823 B2 | 11/2003 | Egawa et al. |
| 6,647,199 B1 | 11/2003 | Pelka et al. |
| 6,671,452 B2 | 12/2003 | Winston et al. |
| 6,738,051 B2 | 5/2004 | Boyd et al. |
| 6,752,504 B2 | 6/2004 | Lee et al. |
| 6,755,545 B2 | 6/2004 | Lee |
| 6,796,700 B2 | 9/2004 | Kraft |
| 6,828,007 B2 | 12/2004 | Obuchi et al. |
| 6,842,571 B2 | 1/2005 | Kramer et al. |
| 6,851,815 B2 | 2/2005 | Lee |
| 6,879,354 B1 | 4/2005 | Sawayama et al. |
| 6,948,838 B2 | 9/2005 | Kunstler |
| 6,957,904 B2 | 10/2005 | Randall |
| 6,966,661 B2 | 11/2005 | Read |
| 6,966,684 B2 | 11/2005 | Sommers et al. |
| 6,976,778 B2 | 12/2005 | Kamijima |
| 6,976,779 B2 | 12/2005 | Ohtsuki et al. |
| 6,986,660 B2 | 1/2006 | Kumar et al. |
| 6,992,733 B1 | 1/2006 | Klein |
| 6,993,242 B2 | 1/2006 | Winston et al. |
| 7,018,085 B2 | 3/2006 | Lee et al. |
| 7,046,907 B2 | 5/2006 | Miyashita |
| 7,063,449 B2 | 6/2006 | Ward |
| 7,286,296 B2 | 10/2007 | Chaves et al. |
| 2006/0174867 A1* | 8/2006 | Schaafsma ............... 126/683 |
| 2008/0271776 A1* | 11/2008 | Morgan ............... 136/246 |
| 2009/0064993 A1* | 3/2009 | Ghosh et al. ............... 126/685 |
| 2009/0067784 A1* | 3/2009 | Ghosh et al. ............... 385/33 |

FOREIGN PATENT DOCUMENTS

| | | |
|---|---|---|
| JP | 2003-234484 A | 8/2003 |
| KR | 1020010022006 A | 3/2001 |
| WO | WO 2006/085339 A2 | 8/2006 |

OTHER PUBLICATIONS

Chaves et al., "Ultra Flat Ideal Concentrators of High Concentration", *Solar Energy*, 2000, pp. 269-281, vol. 69, No. 4, *Elsevier Science Ltd.*, Great Britain.

Chaves et al., "Ideal Concentrators with Gaps", *Applied Optics*, Mar. 1, 2002, pp. 1267-1276, vol. 41, No. 7, *Optical Society of America*, USA.

U.S. Appl. No. 60/915,207, filed May 1, 2007, Morgan.
U.S. Appl. No. 60/942,745, filed Jun. 8, 2007, Morgan.

* cited by examiner

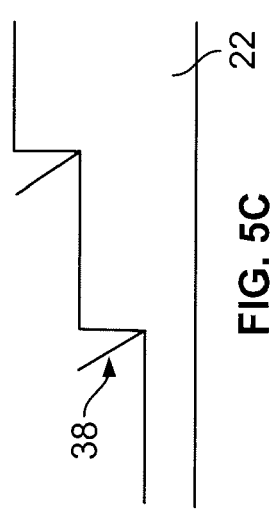
FIG. 5A
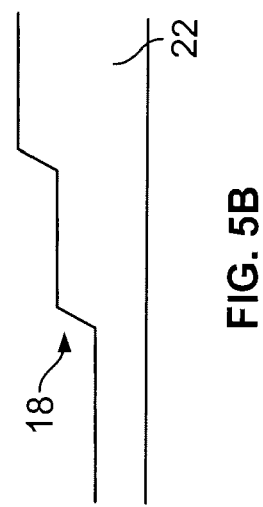
FIG. 5B
FIG. 5C
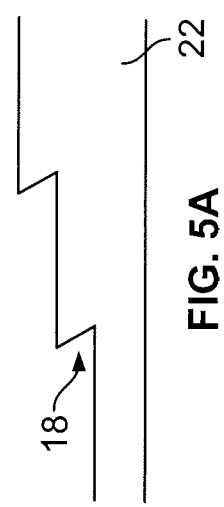
FIG. 5D
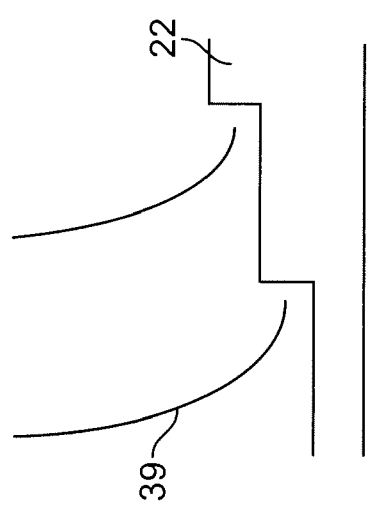
FIG. 5E
FIG. 5F
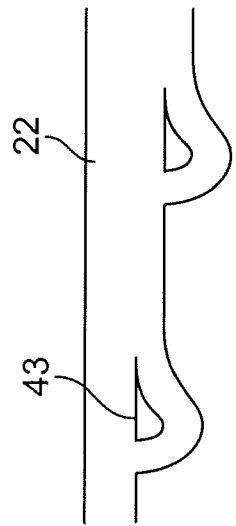
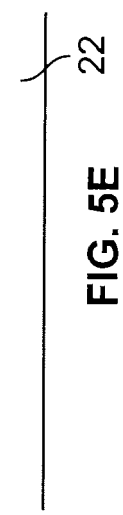

SOLAR ENERGY CONCENTRATOR

This invention is directed to a solar concentrator for producing electrical, thermal and radiative energy. More particularly, the invention is directed to a solar concentrator using a combination of refractive and reflective optics to concentrate and aggregate sunlight from a plurality of concentrator systems.

BACKGROUND OF THE INVENTION

Solar collectors have long been developed for the collection and concentration of sunlight. Increasing the energy density of ambient sunlight enables more efficient conversion to useful forms of energy. Numerous geometries and systems have been developed, but the mediocre performance and high costs of such systems do not permit widespread use. In order to achieve adequate performance and manufacturability, improvements in solar energy collectors are needed.

SUMMARY OF THE INVENTION

A concentrator system includes a combination of optical elements comprising a concentrating element, such as a refractive and/or reflective component, a reflective and/or refractive element to redirect sunlight into a light waveguide which is constructed with a plurality of stepped reflective surfaces for efficient aggregation and concentration into a receiver unit (thermal and/or photovoltaic) and other conventional energy conversion systems. The control of the geometry of the reflective surfaces along with the aspect ratio of the light waveguide enables ready manipulation, collection and concentration of sunlight preferably onto a contiguous area for a variety of commercial applications, including solar cell devices, light pipe applications, heat exchangers, fuel production systems, spectrum splitters and other secondary manipulation of the light for various optical applications.

These and other objects, advantages and applications of the invention, together with the organization and manner of operation thereof, will become apparent from the following detailed description when taken in conjunction with the accompanying drawings.

BRIEF DESCRIPTION OF THE DRAWINGS

FIG. 5A shows a first edge shape of a reflecting element of a waveguide; FIG. 5B shows a second edge shape for a reflecting element of a waveguide; FIG. 5C shows a first separate element for redirecting light as part of a stepped waveguide; FIG. 5D shows a second separate element for redirecting light as part of a stepped waveguide; FIG. 5E shows a system with plural light pipes coupled to a stepped waveguide and FIG. 5F shows a waveguide with embedded redirecting components;

DETAILED DESCRIPTION OF THE PREFERRED EMBODIMENTS

Figure 1:
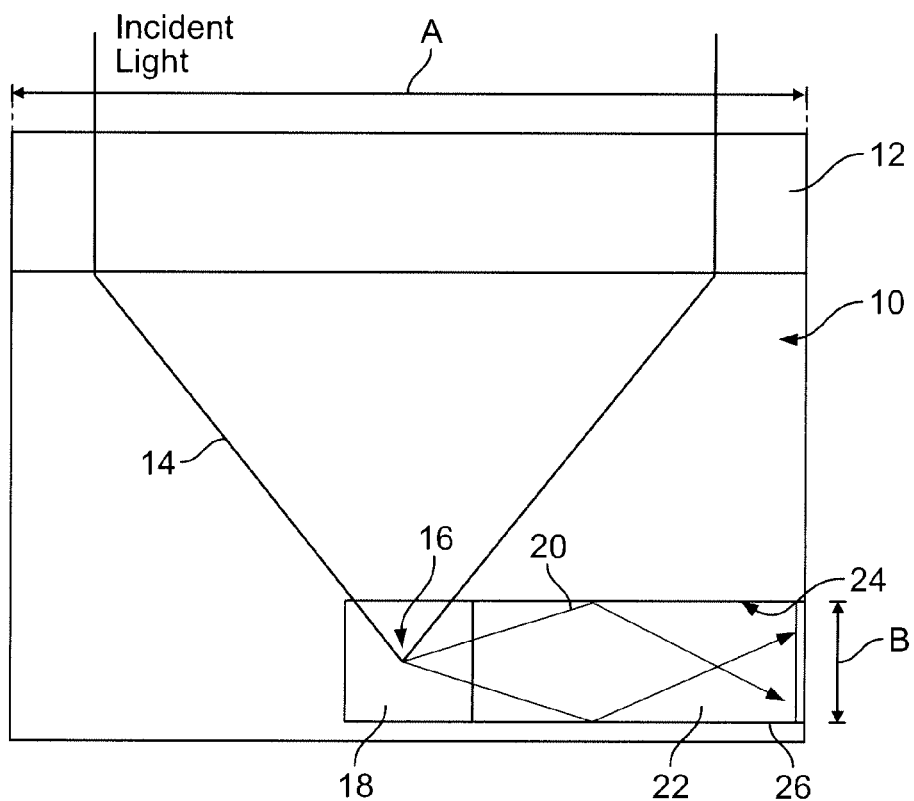
FIG. 1 illustrates a solar energy concentrator generally constructed in accordance with an embodiment of the invention.

A solar energy concentrator system constructed in accordance with a preferred embodiment of the invention is indicated schematically at 10 in FIG. 1. The solar energy concentrator system 10, includes an optical concentrating element 12 which can be any conventional optical concentrator, such as an objective lens, a Fresnel lens, and/or a reflective surface element, such as a parabolic or compound shaped reflector. This optical concentrating element 12 acts on input light 14 to concentrate the light 14 to a small focal area 16. In the preferred embodiment, the small focal area 16 is disposed within reflective component 18, or other conventional optical redirecting element which causes total internal reflection. The reflective component 18 redirects the concentrated light 20 into a waveguide 22. The waveguide 22 is constructed to cause internal reflection of the light 20 which propagates along the waveguide 22 in accordance with Snell's law wherein total internal reflection occurs when the angle of the light 20 incident on surface 24 of the waveguide 22 is greater than the critical angle, $\varnothing_c$:

$$\varnothing_c = \sin(\eta_{waveguide}/\eta_{cladding})$$

Where $\varnothing_c$=critical angle for total internal reflection,
$\eta_{waveguide}$=refractive index of waveguide material
$\eta_{cladding}$=refractive index of a cladding layer or the index at the ambient/waveguide interface.

A receiver 26 is disposed at the end of the waveguide 22 and receives the light 20 for processing into useful energy or other optical applications.

Figure 2:
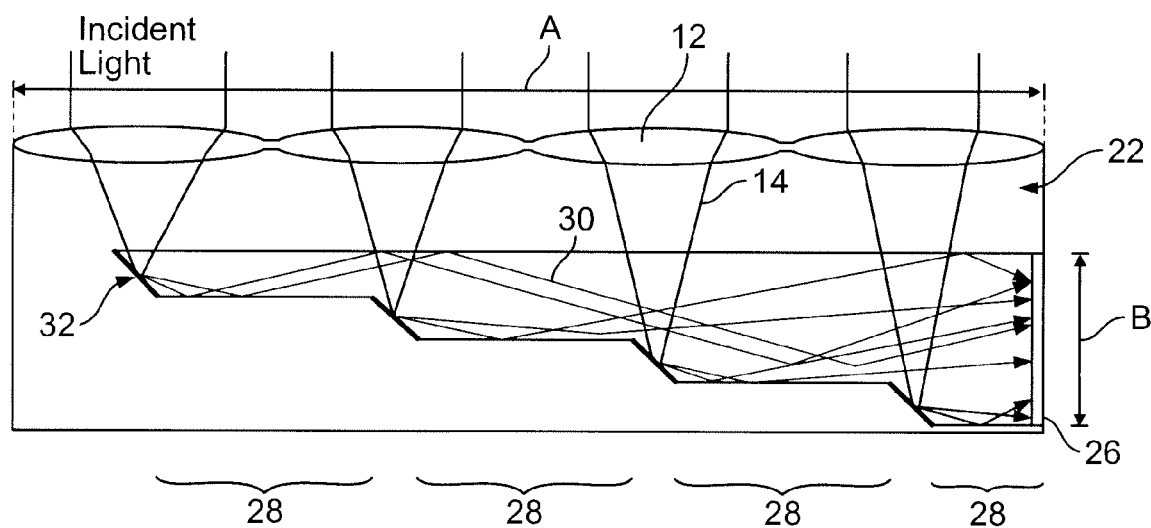
FIG. 2 illustrates a cross-sectional view of one embodiment of a light waveguide shown schematically in FIG. 1.

In a preferred form of the concentrator system 10 shown in FIG. 2, the incident light 14 is concentrated or focused in a first step using the element 12 described hereinbefore. The concentrated light 20 is further processed by associating sections of the concentrator system 10 with reflector/waveguide sections 28. Each of the reflector/waveguide sections 28 comprises a reflective section 32 which receives the concentrated light 20 and redirects light 30 within the associated waveguide section 28 with the light 30 undergoing total internal reflection (TIR) along the length of the entire waveguide 22. A plurality of the reflector/waveguide sections 28 comprise the waveguide 22 and forms a stepped form of waveguide construction.

Figure 3:
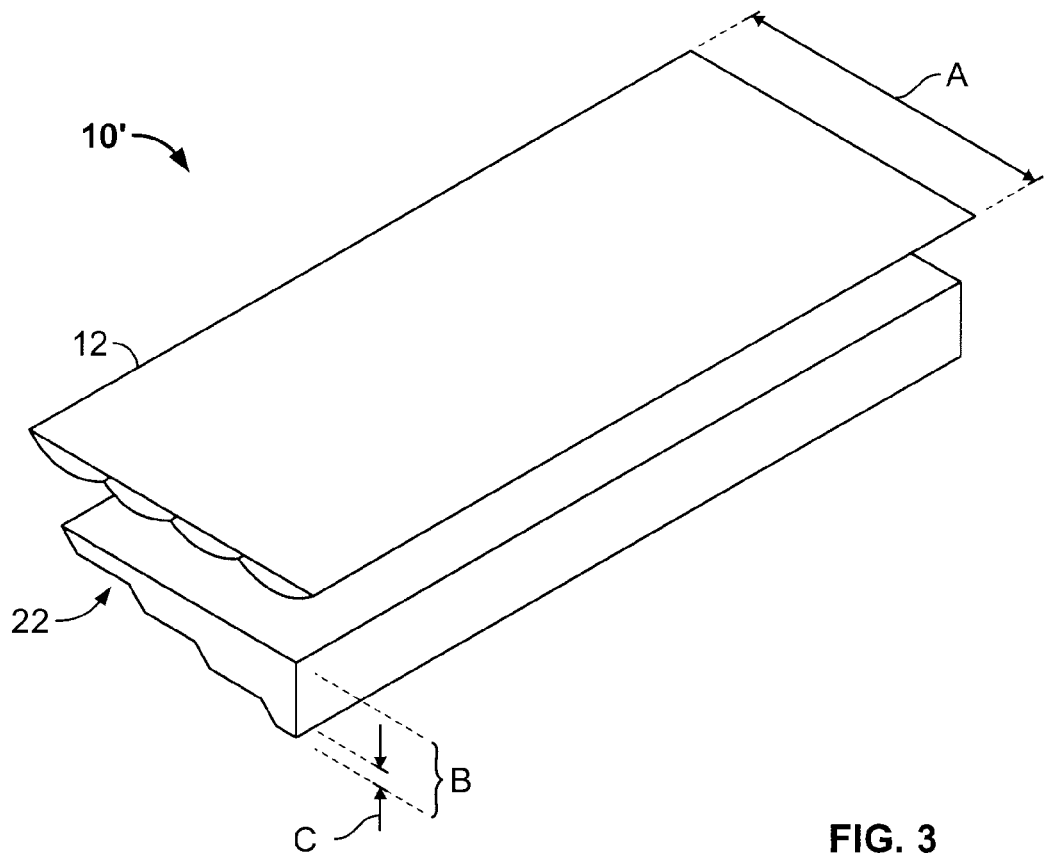
FIG. 3 illustrates another cross-sectional view of a linear embodiment of a light waveguide shown schematically in FIG. 1.

The cross-section of the various reflector/waveguide sections 28 provides a basic building block for various configurations of the concentrator system 10. One exemplary commercial embodiment is shown in FIG. 3 with an aspect ratio A/B, an area concentration factor or energy density ΔØ which is proportional to A/B where A is the length of the waveguide 22 and B is the largest thickness (see FIGS. 2 and 3). In a most preferred embodiment, the thickness B is comprised of a plurality of incremental step heights, C, which provide a clear light pathway for TIR light from each of the reflector/waveguide sections 32.

Figure 4:
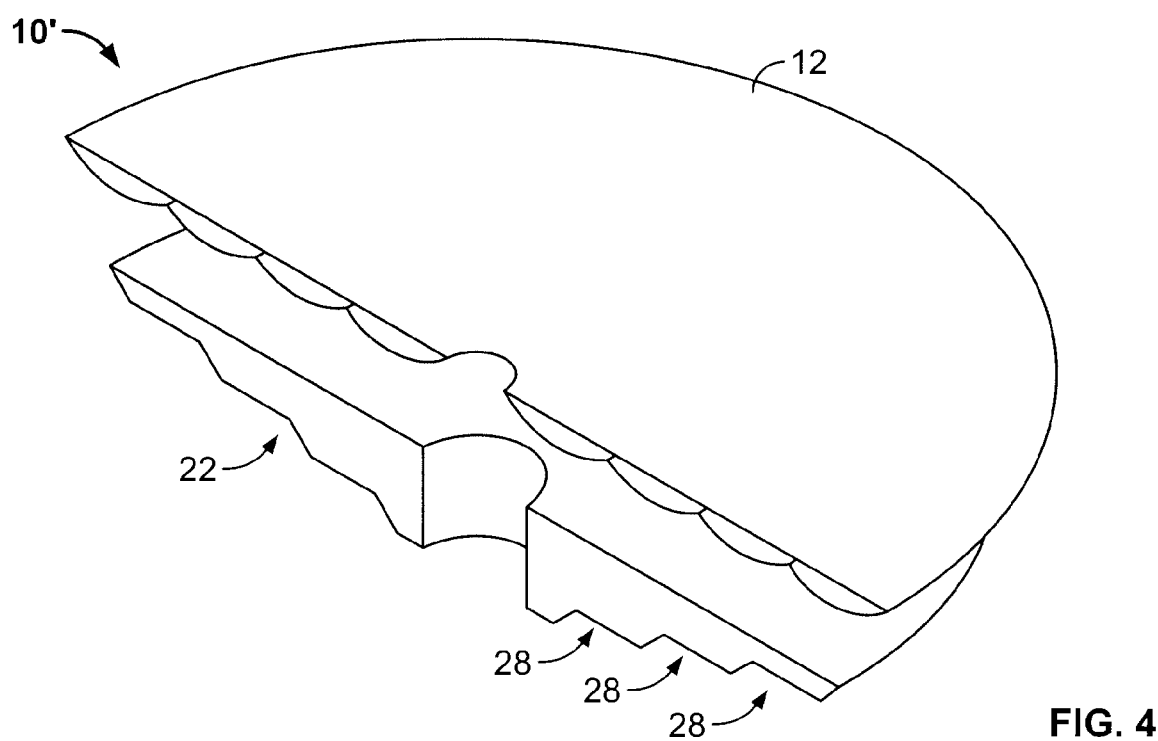
FIG. 4 illustrates another cross-sectional view of a rotational embodiment of a light waveguide shown schematically in FIG. 1.

FIG. 4 illustrates another example of the concentrator system 10 in the form of a rotationally (or axially) symmetric geometry having a concentrator system 10' and the concentrating element 12 in association with the reflector/waveguide sections 28 of the waveguide 22. This rotationally symmetric form of the concentrator system 10' (or the system 10), which can be any portion of a full circle, enables three dimensional radial convergence of the incident light 14 resulting in ΔØ being proportional to $(A/B)^2$ thereby substantially enhancing collection and concentrator efficiency. In a most preferable embodiment of FIG. 4 two axis solar tracking is used as opposed to the single axis tracking for the embodiment of FIG. 3.

In addition to the linear and rotational embodiments of FIGS. 3 and 4, the concentrator system 10' can be disposed both above and/or below the waveguide 22 relative to the direction of the incident light 14. In such embodiments, some of the light 14 will pass through the waveguide 22 and be redirected back to the waveguide 22 by the concentrator system 10'. These forms of systems enable light recycling and thus improve end efficiency and the use of the reflective systems for concentration, described herein, show an increased efficiency for concentration of light relative to conventional refractive system.

In other embodiments, the reflective elements 18 can be angularly adjusted with respect to the waveguide 22 in order to cause TIR. The reflective element 18 can be an integral part of the waveguide 22 with a variety of angular profiles (see FIGS. 5A and 5B). The element 18 also can be separate elements 38 and 39 (see FIGS. 5C and 5D). In addition, the reflective element 18 and the associated waveguide 22 can also take the form of complex light collector pipes 42 and light redirecting components 43 as shown in FIGS. 5E and 5F, respectively.

The above described forms of the concentrator system 10 and 10' provide concentrated light 20 to a contiguous area as opposed to a nodal area, thereby allowing delivery of concentrated solar energy to a variety of downstream receivers 26, such as a solar cell, a light pipe for further processing, a heat exchanger, a secondary concentrator and a light spectrum splitter.

Figure 7:
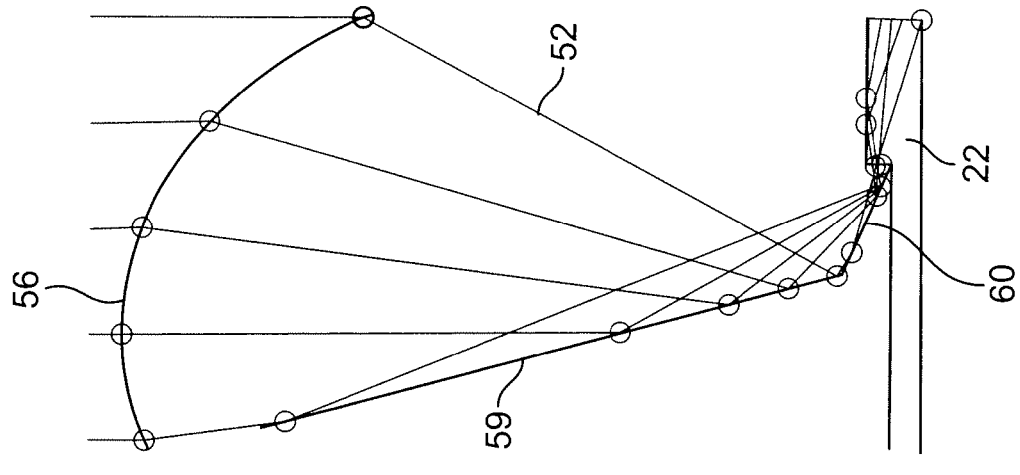
FIG. 7 shows a curved concentrating element and two planar reflectors coupled to a waveguide.
Figure 6:
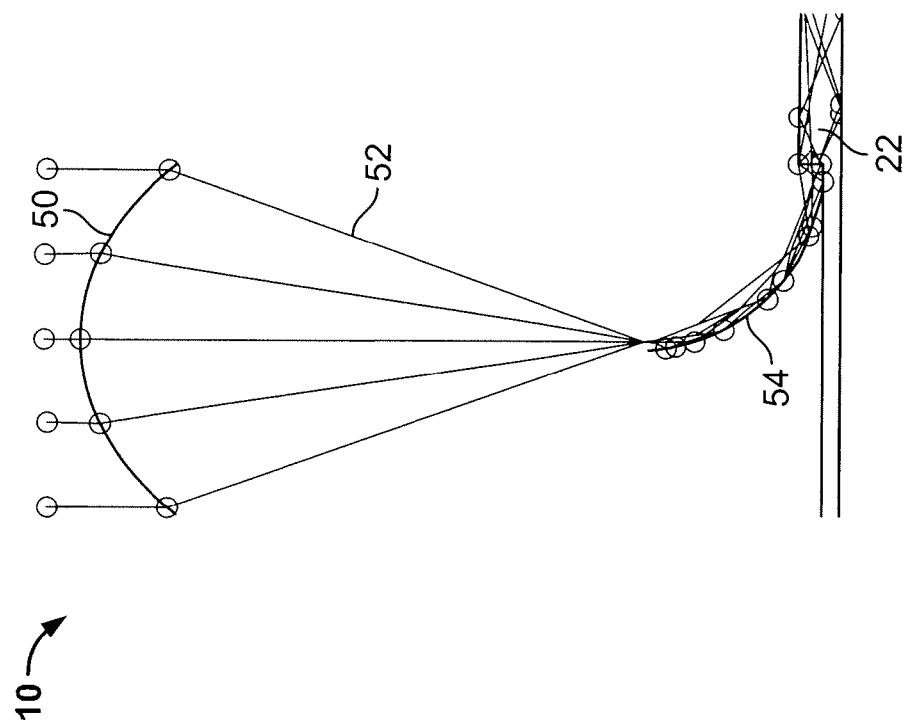
FIG. 6 shows a curved concentrating element and curved reflector coupled to a waveguide.

In yet another series of embodiments shown in FIGS. 6-11B, a variety of optical components can be used in combination to further and substantially enhance both the concentration and collection efficiency. FIG. 6 in a most preferred embodiment shows a curved concentrating element 50 directing light 52 onto a curved reflector 54 which passes the light 52 into the waveguide 22. FIG. 7 in another most preferred embodiment shows another curved concentrating element 56 which directs the light 52 off a reflector 58 having two planar surfaces 59 and 60 which redirect the light 52 by TIR into the waveguide 22. FIG. 8A shows a partially closed optical element 64 which redirects the light 52 at interface 66, reflects the light 52 off curved reflector 68 focusing the light 52 onto interface 70 between a bottom reflective surface 72 of the optical element 64. As best seen in the enlarged view of FIG. 8B, the waveguide 22 has a substantially complementary angular match to the reflective surface 72.

Figure 8A:
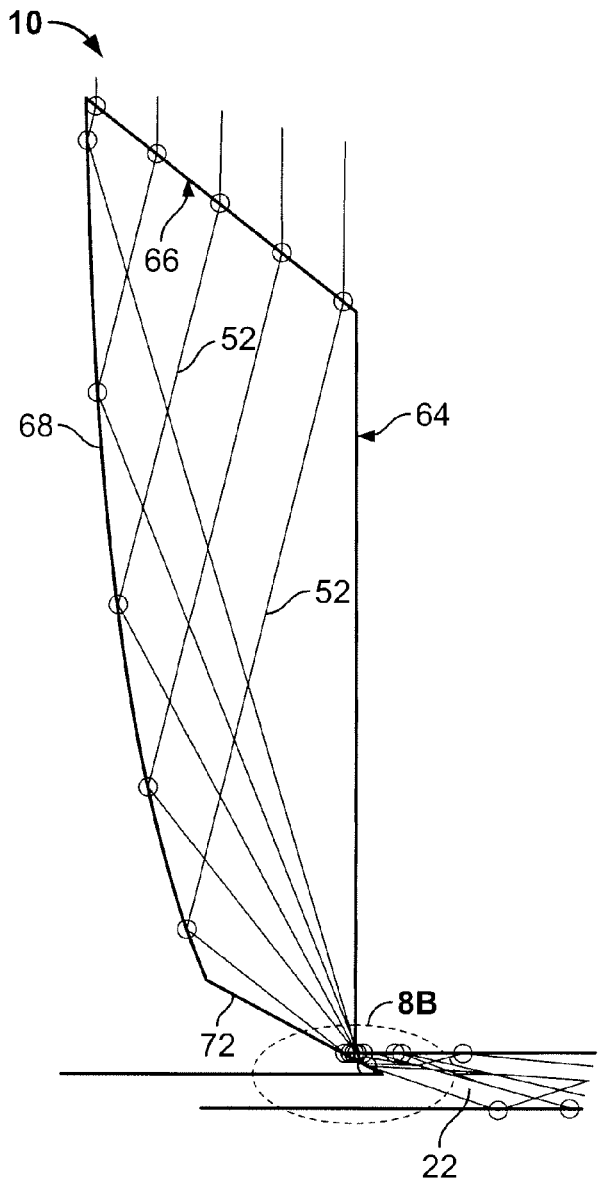
FIG. 8A shows a closed optical element coupled to a waveguide and FIG. 8B shows an enlarged view of a portion of FIG. 8A at the juncture of the optical element and waveguide.
Figure 8B:
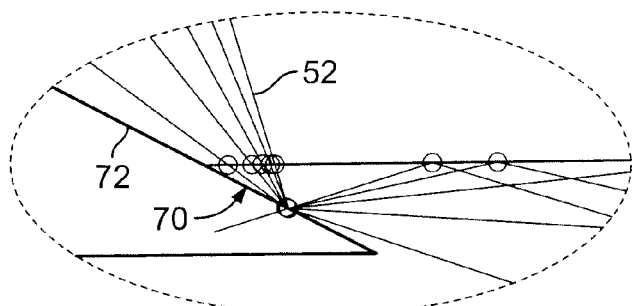
Figure 9A:
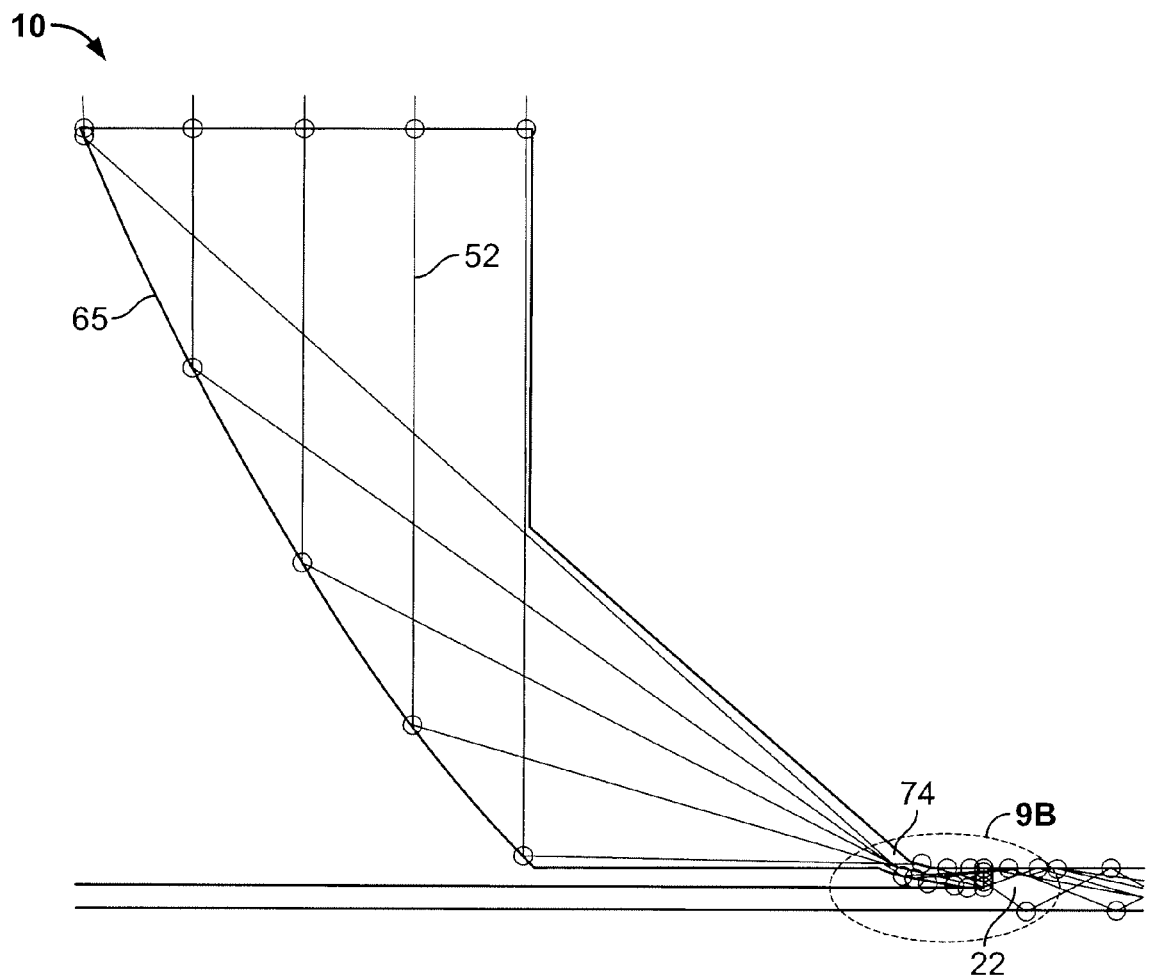
FIG. 9A shows another closed optical element coupled to a waveguide and FIG. 9B shows an enlarged view of a portion of FIG. 9A at the juncture of the optical element and the waveguide.
Figure 9B:
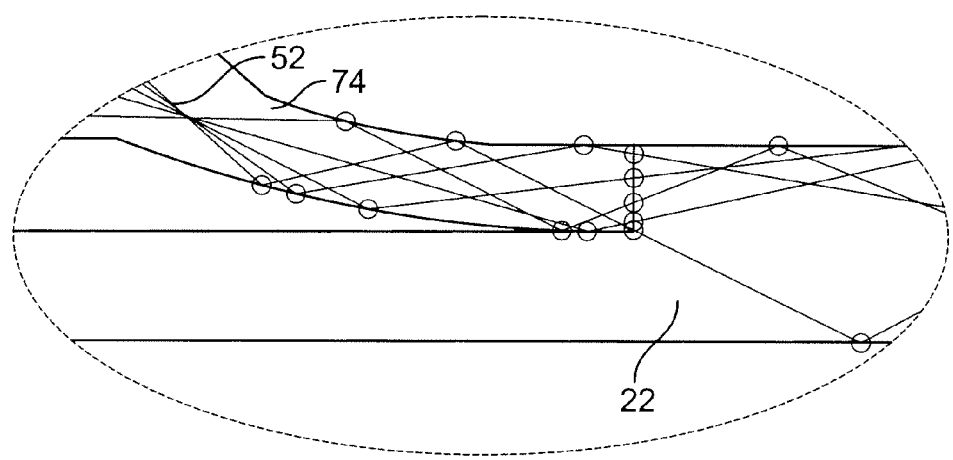

In FIG. 9A in another most preferred embodiment is a similar system as in FIG. 8A, but the optical element 65 is closed and coupled to an extension waveguide 74 (a form of light pipe) which collects the light 52 and transmits it into the waveguide 22 (as best seen in FIG. 9B).

Figure 10A:
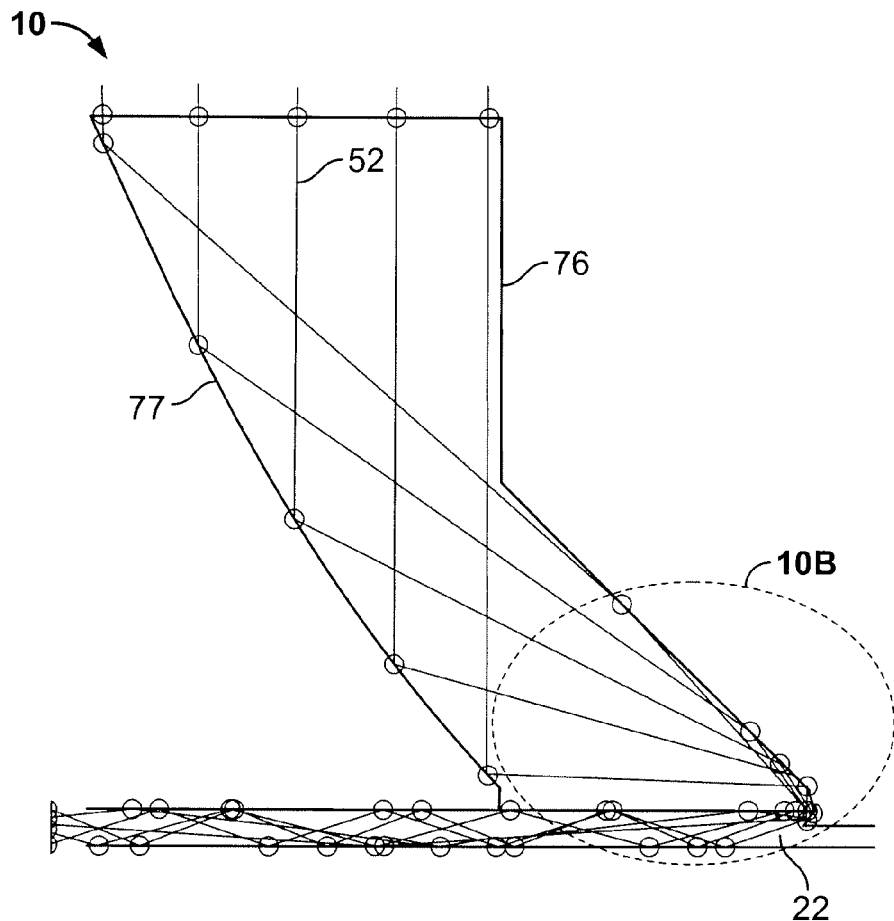
FIG. 10A shows another closed optical element coupled to a waveguide and FIG. 10B shows an enlarged view of a portion of FIG. 10A at a juncture of the optical element and the waveguide.
Figure 10B:
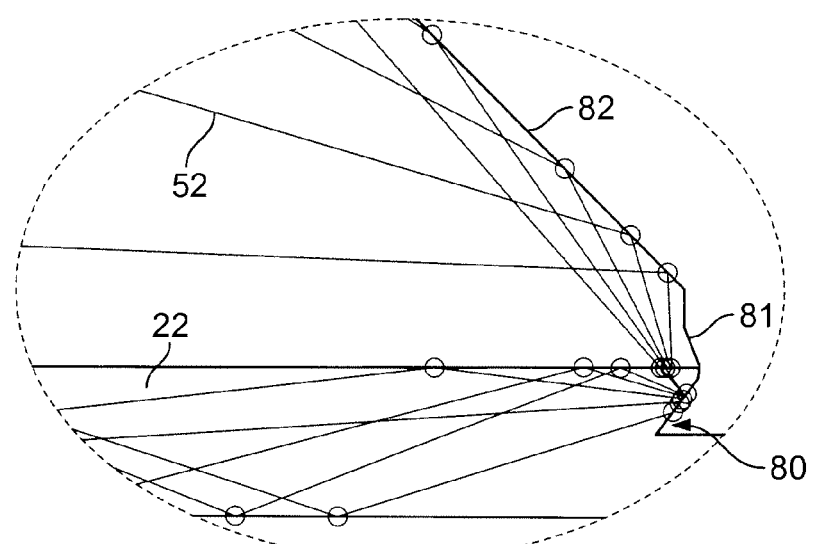

In FIG. 10A an optical element 76 is closed with the input light 52 reflected by TIR from reflective surface 77 with a particular angular cross section best shown in FIG. 10B which enables collection of the light from TIR and coupling with the waveguide 22 from reflection off surfaces 80 and 82.

Figure 11A:
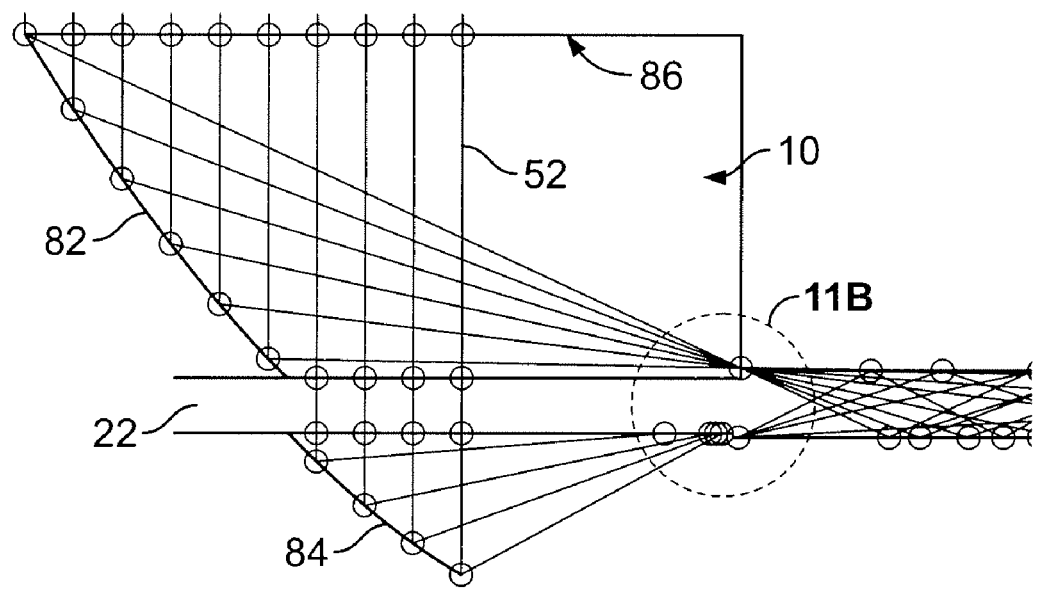
FIG. 11A shows a further closed element coupled to a waveguide and FIG. 11B shows an enlarged view of portion of FIG. 11A at a juncture of the optical element and the waveguide.
Figure 11B:
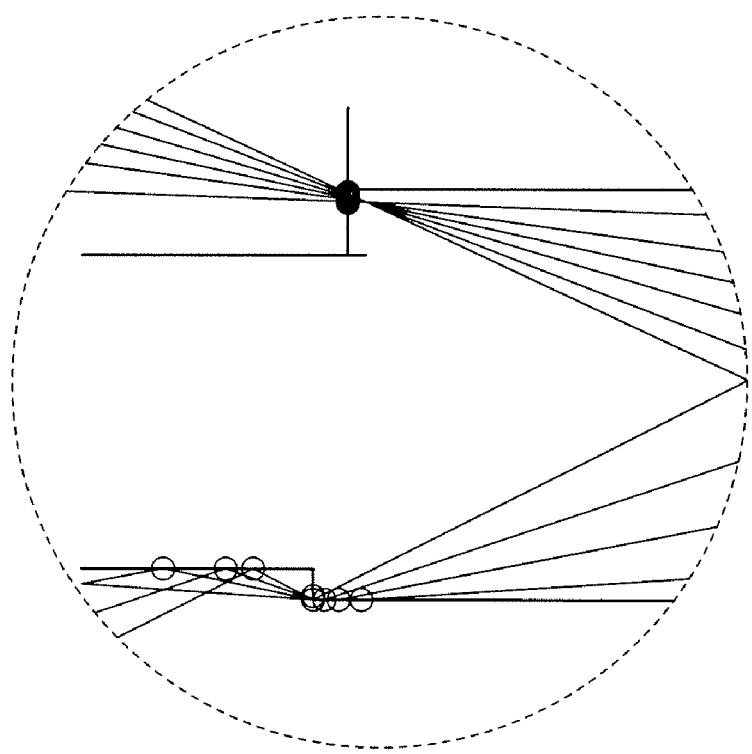

In FIG. 11A an optical element 82 cooperates with another reflector 84 to direct the light 52 into the waveguide 22 from the two different optical sources 82 and 84, thereby further ensuring collection of all the light incident on surface 86 of the optical element 82. In this embodiment the optical elements 82 and 84 perform the role of both concentrating elements and reflecting elements.

The concentration of light achieved by the concentrator system 10 being a function of the aspect ratio A/B leads to a highly compact concentrator system 10. The device can aggregate light from a relatively wide area and concentrate it to a relatively small receiver that has a contiguous area while remaining highly compact. This simplifies production by reducing the volume of material required, allowing for multiple units to be made from a single mold and reducing assembly complexity.

Figure 12:
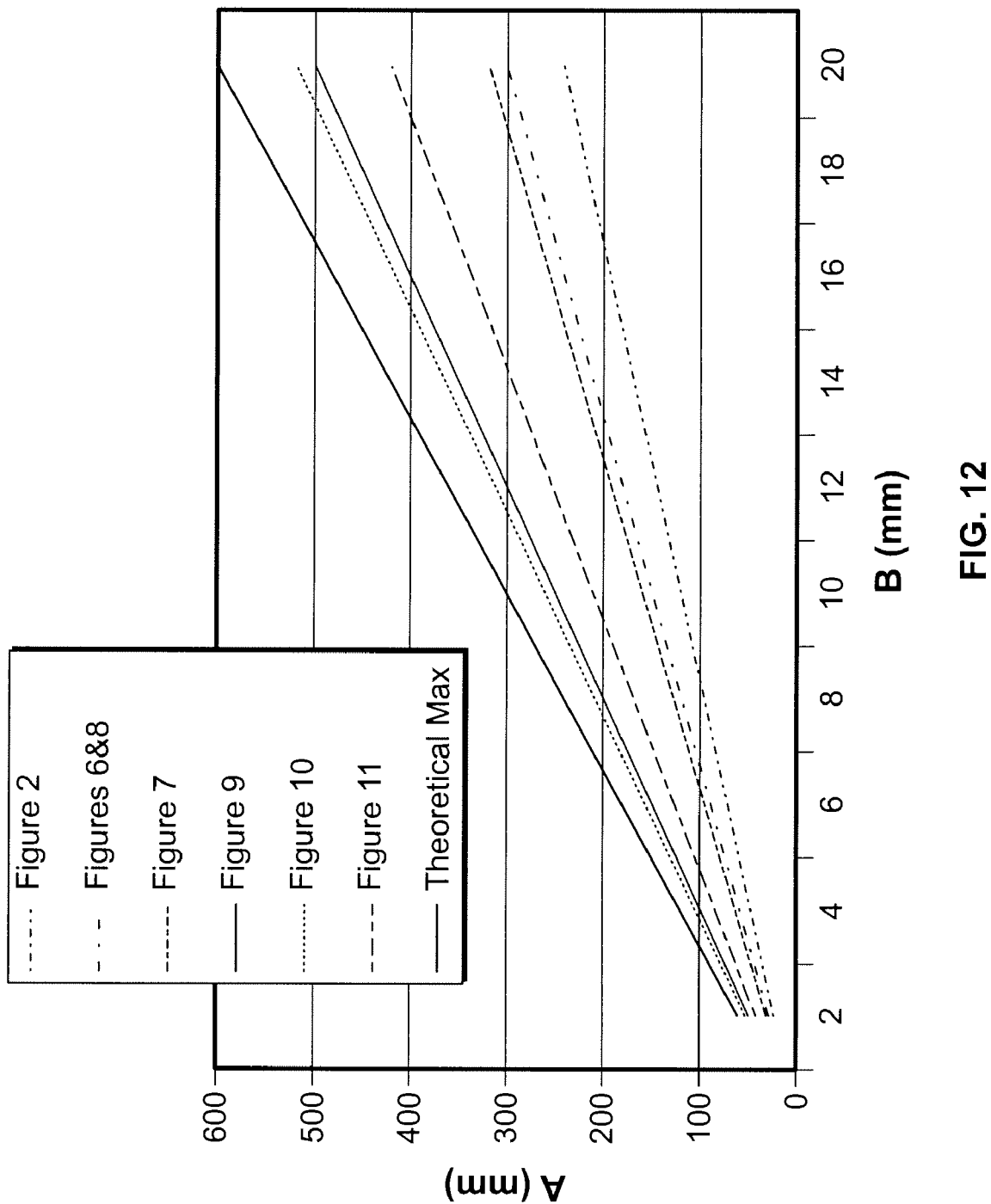
FIG. 12 shows ray tracing results for the optical systems of FIGS. 2 and 6-11.

FIG. 12 shows the results of ray tracings performed on the designs depicted in FIGS. 2 and 6-11. Each design demonstrates a particular performance in terms of its ability to concentrate light in the linear dimension, as shown by the ratio of A/B. The data is for light having an input cone half angle of +−1 degree, an output cone half angle of +−20 degrees, an initial refractive index of n=1, and a final refractive index of n=1.5. The theoretical maximum allowable concentration of light with those input parameters is 30× in the linear dimension, whereas FIG. 9 for example achieves a concentration factor of 25×. Since the concentration factor in the linear dimension is proportional to the aspect ratio A/B, the design shown in FIG. 9 can deliver a concentrator that is 250 millimeters long (A) while only 10 millimeters in thickness (B); or a concentrator that is 500 millimeters long (A) while only 20 millimeters in thickness (B). This represents a highly compact concentrator system 10 that can effectively aggregate concentrated light from a relatively wide area and deliver it to a single receiver.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A solar concentrator, comprising:
   a plurality of optical elements disposed adjacent each other with each of the plurality of optical elements including:
   (a) a concentrator element for collecting and repositioning input light; and
   (b) an associated redirecting element which is associated with and separate from the concentrator element for receiving the light from the concentrator element wherein the concentrating element of each of the plurality of optical elements is separated from at least one portion of the associated redirecting element by a layer within which the light does not undergo a repositioning change of direction and the layer being contiguous between at least a portion of each of the associated redirecting elements; and the solar concentrator further including:

a stepped waveguide for receiving the light from the at least one portion of the associated redirecting element which is constructed to reposition the light into the stepped waveguide for accumulation.

2. The solar concentrator as defined in claim 1 wherein the associated redirecting element is disposed opposite the concentrator element which is shaped for repositioning of an input light edge ray to substantially at a perpendicular angle relative to the input light edge ray and the associated redirecting element being shaped to receive the light edge ray from the concentrating element to reposition the light edge ray at a second substantially perpendicular angle.

3. The solar concentrator as defined in claim 2 wherein the light edge ray first repositioned by the light redirecting element is further repositioned by the at least one portion of the associated redirecting element at yet another substantially perpendicular angle.

4. The solar concentrator as defined in claim 1 wherein at least part of the associated redirecting element comprises a discontinuous surface.

5. The solar concentrator as defined in claim 1 wherein at least part of the associated redirecting element is physically discontinuously disposed apart from the concentrator element, thereby enabling separate manufacture of the concentrator element from at least one part of the associated redirecting element.

6. The solar concentrator as defined in claim 5 wherein the plurality of optical elements and the stepped waveguide are disposed in a vertical stack of physically separate components, thereby enabling direct assembly of separate parts comprising the solar concentrator.

7. The solar concentrator as defined in claim 1 wherein the at least one portion of the associated redirecting element comprises an entry element into the stepped waveguide.

8. The solar concentrator as defined in claim 1 wherein at least a portion of the associated redirecting element is separate from the stepped waveguide.

9. The solar concentrator as defined in claim 1 wherein the stepped waveguide is comprised of incremental stepped sections, the step height being about the height of the concentrated light being input into the stepped waveguide at that section.

10. The solar concentrator as defined in claim 1 wherein the stepped waveguide has upper and lower horizontal surfaces which are substantially parallel.

11. The solar concentrator as defined in claim 1 wherein the plurality of optical elements input light to the stepped waveguide to provide aggregated light and the concentrator further includes a receiver which collects the aggregated light.

12. The solar concentrator as defined in claim 1 wherein the concentrator element is selected from the group consisting of a spherical lens, an aspherical lens, a Fresnel lens, a cylindrical lens, a tailored shape lens, a parabolic surface, an elliptical surface, a hyperbolic surface, an arc and a tailored shape reflective surface.

13. The solar concentrator as defined in claim 1 wherein the optical elements are disposed at least one of above the waveguide and below the waveguide.

14. The solar concentrator as defined in claim 1 wherein the associated redirecting element is selected from the group of a flat reflective surface, a parabolic surface, an elliptical surface, a hyperbolic surface, an arc and a refractive component selected from the group of a spherical component, an aspherical component, a Fresnel lens and a tailored shape.

15. The solar concentrator as defined in claim 1 wherein the concentrator element comprises a refracting lens element such that the light achieves total internal reflection by the redirecting element.

16. The solar concentrator as defined in claim 1 where the solar concentrator is linearly symmetric.

17. The solar concentrator as defined in claim 1 where the solar concentrator is rotationally symmetric.

18. A solar concentrator, comprising:

a plurality of optical elements disposed adjacent each other with each of the plurality of optical elements including:

(a) a refractive concentrator element for collecting and repositioning input light; and (b) an associated redirecting element which is associated with and separate from the concentrator element for receiving the light from the concentrator element wherein the concentrating element of each of the plurality of optical elements is separated from at least one portion of the associated redirecting element by a layer within which the light does not undergo a repositioning change of direction and the layer being contiguous between at least a portion of each of the associated redirecting elements; and the solar concentrator further including:

a stepped waveguide for receiving the light from the at least one portion of the associated redirecting element which is constructed to reposition the light into the stepped waveguide for accumulation.

19. A solar concentrator, comprising:

a plurality of optical elements disposed adjacent each other with each of the plurality of optical elements including:

(a) a concentrator element for collecting and repositioning input light; and (b) a redirecting element comprised of (1) a first redirecting element portion receiving repositioned light from the concentrator and having a discontinuous spatial surface and disposed substantially opposed to the concentrator element; and the first redirecting element further repositioning the light; and (2) a second redirecting element portion that receives the repositioned light from the first redirecting element and further repositions the light, wherein the redirecting element includes a contiguous connection between at least a portion of each of the adjacent redirecting elements with the light avoiding repositioning within the contiguous connection; and the solar concentrator further including:

a stepped waveguide physically separated from the concentrator element and the waveguide for receiving the repositioned light from the second redirecting element portion, thereby enabling vertical stacking of separately manufactured parts of the solar concentrator.

20. The solar concentrator as defined in claim 19 wherein at least a portion of the redirecting element is disposed opposite the concentrator element and the concentrating element being shaped for repositioning of an input light edge ray to substantially a perpendicular angle relative to the input light edge ray and at least a portion of the redirecting element shaped to receive the light edge ray from the concentrating element to reposition the light edge ray at a second substantially perpendicular angle.

21. The solar concentrator as defined in claim 19 wherein the light edge ray first repositioned by the light redirecting element is further repositioned by the at least one portion of the redirecting element at yet another substantially perpendicular angle.

22. The solar concentrator as defined in claim 19 wherein the second redirecting element comprises an entry element into the waveguide.

23. The solar concentrator as defined in claim 19 wherein the waveguide is comprised of incremental stepped sections, the step height being about the height of the concentrated light being input into the waveguide at an input section.

24. The solar concentrator as defined in claim 19 wherein the concentrator element of each of the plurality of optical elements is separated from the second redirecting element by a layer within which the repositioned light does not undergo a change of direction.

25. The solar concentrator as defined in claim 19 wherein a lower surface of the concentrator element and the first redirecting element and an upper surface of the waveguide are substantially parallel to each other.

26. The solar concentrator as defined in claim 19 wherein the plurality of optical elements and the waveguide are disposed in a vertical stack of physically separate components, thereby enabling direct assembly of separate parts comprising the solar concentrator.

27. The solar concentrator as defined in claim 19 wherein the concentrating element of each of the plurality of optical elements is separated from at least part of the redirecting element by a vertical layer within which the light does not undergo a repositioning charge of direction.

28. The solar concentrator as defined in claim 19 wherein the plurality of optical elements provide aggregated light to the waveguide and the concentrator further includes a receiver which collects the aggregated light.

29. The solar concentrator as defined in claim 19 wherein the concentrator element is selected from the group consisting of a spherical lens, an aspherical lens, a Fresnel lens, a cylindrical lens, a tailored shape lens, a parabolic surface, an elliptical surface, a hyperbolic surface, an arc and a tailored shape reflective surface.

30. The solar concentrator as defined in claim 19 wherein the redirecting element is selected from the group of a flat reflective surface, a parabolic surface, an elliptical surface, a hyperbolic surface, an arc and a refractive component selected from the group of a spherical component, an aspherical component, a Fresnel lens and a tailored shape.

31. A solar concentrator comprising:
a plurality of optical elements disposed adjacent each other with each of the plurality of optical elements including a concentrating element comprised of a combination of (1) a surface between a high index material and a low index material enabling refraction of input light and (2) a parabolic reflective surface which repositions the input light with the combination outputting the light without the light being repositioned more than once by the parabolic reflective surface;
a waveguide comprised of a plurality of portions with each of the portions associated with a corresponding one of the concentrating elements, each of the waveguide portion further having a step feature associated with receiving the output light from the concentrating element and the waveguide including top and bottom walls which are substantially parallel to each other, thereby preserving concentration of the light for delivery to a receiver.

32. A solar concentrator, comprising:
a plurality of optical elements disposed adjacent each other with each of the plurality of optical elements including a concentrator element for collecting and repositioning input light; and the solar concentrator further including:
a stepped waveguide comprised of a plurality of portions with each of the portions associated with a corresponding one of the concentrating elements, each of the waveguide portion further having a step feature associated with receiving the output light from the concentrating element;
wherein the plurality of optical elements and the waveguide each form contiguous horizontal layers disposed in a vertical stack.

* * * * *